(12) United States Patent
Wong et al.

(10) Patent No.: US 8,971,029 B2
(45) Date of Patent: Mar. 3, 2015

(54) MULTI-DISPLAY HINGE ASSEMBLY

(75) Inventors: Glenn A Wong, Redwood City, CA (US); Mark C Solomon, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 106 days.

(21) Appl. No.: 13/429,522

(22) Filed: Mar. 26, 2012

(65) Prior Publication Data

US 2013/0250492 A1    Sep. 26, 2013

(51) Int. Cl.
| | |
|---|---|
| H05K 5/00 | (2006.01) |
| H05K 7/00 | (2006.01) |
| G11B 33/02 | (2006.01) |
| A47G 1/10 | (2006.01) |
| E04G 3/00 | (2006.01) |

(52) U.S. Cl.
USPC ............ 361/679.27; 361/679.01; 361/679.02; 361/679.04; 361/679.26; 361/679.29; 369/75.21; 292/4; 292/341.17

(58) Field of Classification Search
CPC ................ H05K 5/0026; H05K 5/026; H05K 2201/10159; G06F 1/16; G06F 1/33225
USPC .............. 361/679.01–679.17, 679.21–679.3, 361/679.55–679.59; 455/575.1, 575.3, 455/575.4, 575.8; 369/282, 291, 253, 369/44.16, 75.5
See application file for complete search history.

(56) References Cited

U.S. PATENT DOCUMENTS

| | | | |
|---|---|---|---|
| 7,221,330 B2* | 5/2007 | Finke-Anlauff | 345/1.1 |
| 2009/0079664 A1* | 3/2009 | Nagai et al. | 345/1.3 |
| 2010/0041448 A1* | 2/2010 | Gaddy et al. | 455/575.3 |
| 2010/0064244 A1* | 3/2010 | Kilpatrick et al. | 715/773 |
| 2012/0275099 A1* | 11/2012 | Yamami et al. | 361/679.01 |

OTHER PUBLICATIONS

Khalilbeigi, M. et al.; "Foldme: Interacting with Double-sided Foldable Displays"; 2012; pp. 33-40.

* cited by examiner

*Primary Examiner* — Jerry Wu
(74) *Attorney, Agent, or Firm* — Hewlett-Packard Patent Department (57) ABSTRACT

Embodiments of the present invention disclose a multi-display hinge assembly. According to one embodiment, the multi-display hinge assembly includes a first housing and second housing in addition to a hinge that rotatably connects the first housing with the second housing. Still further, a coupling element is configured to join an edge of the first housing with an edge of the second housing when the first housing and the second housing are placed along the same plane.

11 Claims, 6 Drawing Sheets

MULTI-DISPLAY HINGE ASSEMBLY

BACKGROUND

The emergence and popularity of mobile computing has made portable electronic devices, due to their compact design and light weight, a staple in today's marketplace. Many portable electronic devices employ a clam-shell type design such as notebook computers, netbooks, and convertible tablet personal computers. Generally, a clam-shell design consists of two housings connected together at a common end. In most cases, one housing is utilized to provide a viewable display to a user while a second housing includes an area for user input. Non-convertible tablet computers and other handheld devices generally feature a single touchscreen display for both accepting user input and displaying images to an operating user. As these portable electronic devices become more widespread in use, additional functionality and display/viewing area are desired by users.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 3A is a three-dimensional perspective view of the multi-display hinge assembly in a semi-folded positioned, while

FIG. 4A is a three-dimensional perspective view of the multi-display hinge assembly in an extended and locked positioned, while

FIG. 5A is a three-dimensional perspective view of the hinge area moving from a locked to an unlocked position, while

DETAILED DESCRIPTION OF THE INVENTION

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Generally, a clam-shell design consists of two housings connected together at a common end—an upper housing commonly utilized for providing display to a user and a lower housing utilized to house the circuitry for input operation on the portable electronic device (e.g., keyboard, touch pad, ports, etc). Tablet computing devices, such as the HP Touch-Pad for example, include a single display used both for accepting user input via a virtual keyboard in addition to displaying viewing content for the operating user. Since the graphical user interface or display area is limited to the size of the touchscreen, viewing large amounts of content typically requires page scrolling or reducing the size of the image and/or text in order to fit onto one page (i.e., display screen). Moreover, input via the virtual keyboard often consumes a large portion of the touchscreen thereby reducing the viewable area for graphical content even further. As such, there is a need in the art for a display system capable of having an extendable viewing area and without sacrificing the size or quality of the graphical content.

Embodiments of the present invention disclose a multi-display hinge assembly and computing system. According to one example, a plurality of display housings are connected together via a tension hinge. The tension hinge allows rotation of each of the connected display housings from an open and stacked position to a locked and coplanar position. In particular, a mechanical tension hinge is designed to allow two adjacent display surfaces to align and remain fixed side-by-side. By locking the multiple displays together, the work or viewing surface associated with the displays is increased.

Figure 1A:
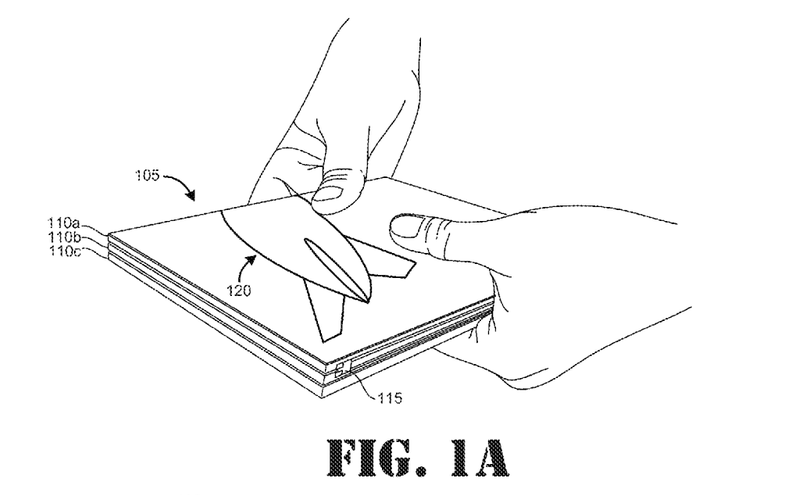
FIGS. 1A and 1B are three-dimensional perspective views of a multi-display hinge assembly according to an example of the present invention.
Figure 1B:
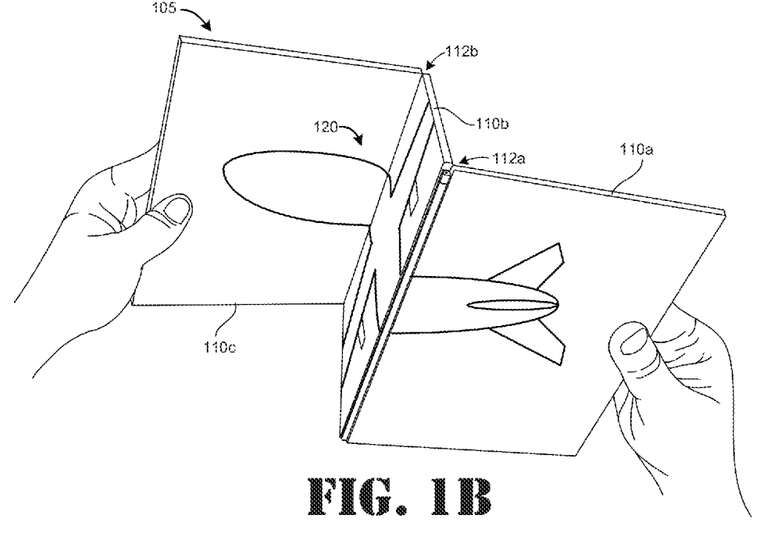

Referring now in more detail to the drawings in which like numerals identify corresponding parts throughout the views, FIGS. 1A and 1B are three-dimensional perspective views of a multi-display hinge assembly according to an example of the present invention. In the example of FIG. 1A, an operating user holds a multi-display assembly 105 including three display housings 110a-110c. Each display housing 110a-110c may be machined or cast aluminum and represent an electronic visual display system (e.g., tablet computer) configured to display text, visual images, and/or graphics 120. In accordance with one example embodiment, the surface of each display housing is touchsensitive for facilitating touch-based interaction with an operating user. Here, the display assembly 105 is an open or unlocked position with the display housings 110a-110c vertically-stacked on top of one another. That is, display housing 110a is positioned above display housing 110b, which is positioned above display housing 110c (i.e., assembly 105 is vertically-aligned or aligned perpendicular to the normal surface). The display housings 110a-110c are linked together via a hinge mechanisms 115 as will be in described in further detail below. FIG. 1B depicts the multi-display hinge assembly 105 in a semi-folded position. In the present example, display housing 110a is pulled away from display housing 110b and 110c. More particularly, display housing 110a is coupled to display housing 110b along a first hinge edge 112a, while display housing 110b is coupled to display housing 110c along a second hinge edge 112b. As shown here, the displayed image 120 extends across the displays associated with each display housing 110a, 110b, and 110c such that the displays and housings operate as one large display device.

Figure 2A:
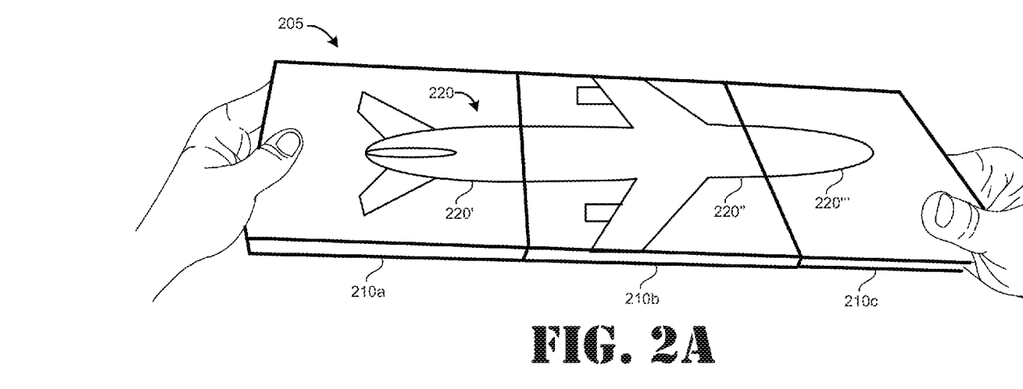
FIGS. 2A and 2B are three-dimensional perspective views of the multi-display hinge assembly in an extended and locked position according to an example of the present invention.
Figure 2B:
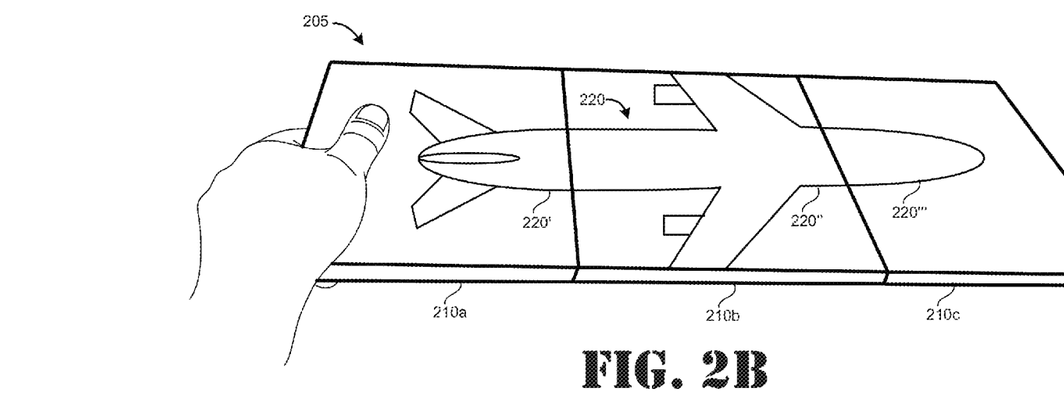

FIGS. 2A and 2B are three-dimensional perspective views of the multi-display hinge assembly in a coplanar and locked position according to an example of the present invention. FIG. 2A depicts the multi-display hinge assembly 205 in an extended position in which each display housing 210a-210c lies coplanar and immediately adjacent to each other. More specifically, display housing 210a is positioned horizontally-adjacent to display housing 210b, which is positioned horizontally-adjacent to display housing 210c. Still further, the associated display surface of each housing 210a, 210b, 210c is configured to display a section 220', 200', 220''' respectively, of the entire image 220. Accordingly, the multi-display hinge assembly 205 of the present examples is capable of providing a significantly larger display space than prior portable computing systems. Moreover and as shown in FIG. 2B, the mechanical hinge design allows for the display housings 210a-210c to remain securely fixed side-by-side so as to create a larger viewing space while also providing sufficient rigidity that a user may hold the multi-display hinge assembly 205 with only one hand.

Figure 3A:
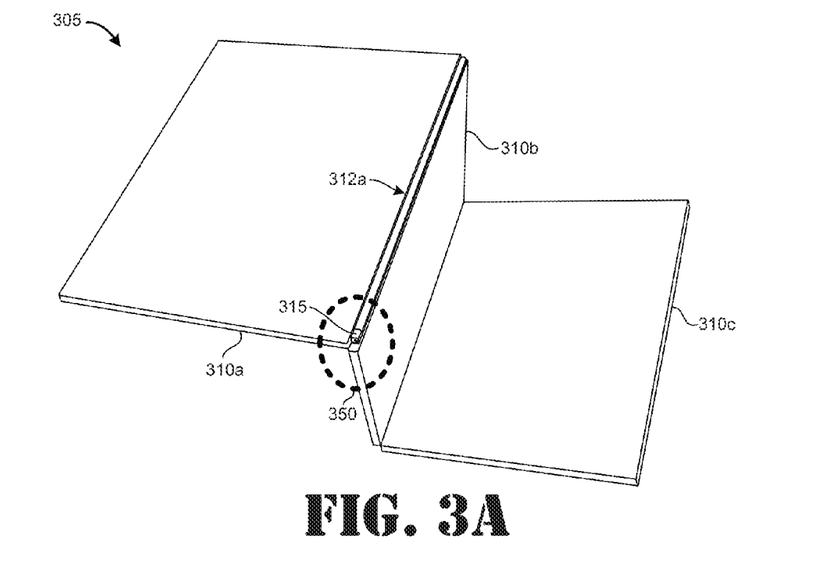
Figure 3B:
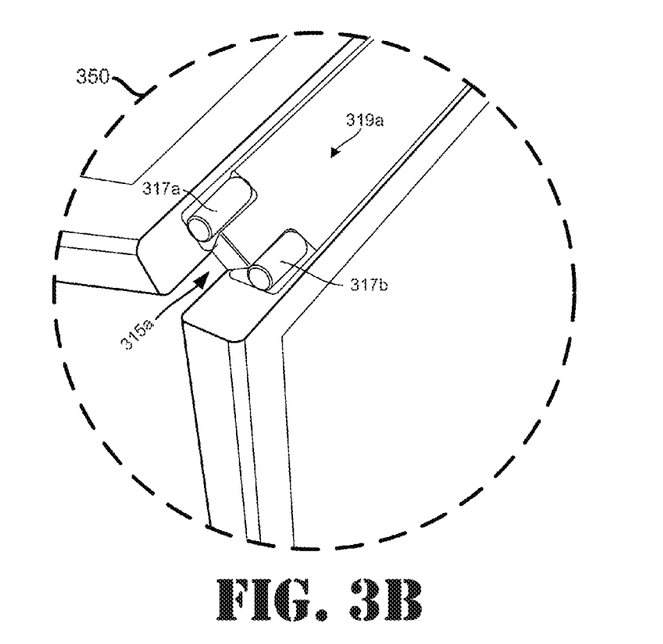
FIG. 3B is an enlarged view of the hinge area in FIG. 3A according to an example of the present invention.

FIG. 3A is a three-dimensional perspective view of the multi-display hinge assembly in a semi-folded positioned, while FIG. 3B is an enlarged view of the hinge area in FIG. 3A according to an example of the present invention. As shown in FIG. 3A, the hinge assembly 305 is positioned in a semi-folded operating position. That is, the display housings 310a-310c are positioned at acute angles relative to one another. According to one example, transition from a folded to a semi-folded position may be accomplished by the user lifting display housing 310a along the non-hinged edge (i.e., edge opposite the interconnected edge) and then pulling the display housing 310a away from the display housing 310b. Additionally, continuous movement of the display housing 310a will also serve to lift display housing 310b away from display housing 310c. FIG. 3B depicts an enlarged view of the hinge edge 312a. Here, the mechanical hinge 315 is in an unlocked position and exposed to the user. In accordance with one example embodiment, the mechanical hinge 315 includes a coupling member 319 and a pair of bearing elements 317a and 317b for enabling pivot rotation of interconnected display housings (e.g., 310a and 310b) about a hinge edge (e.g., 312a).

Figure 4A:
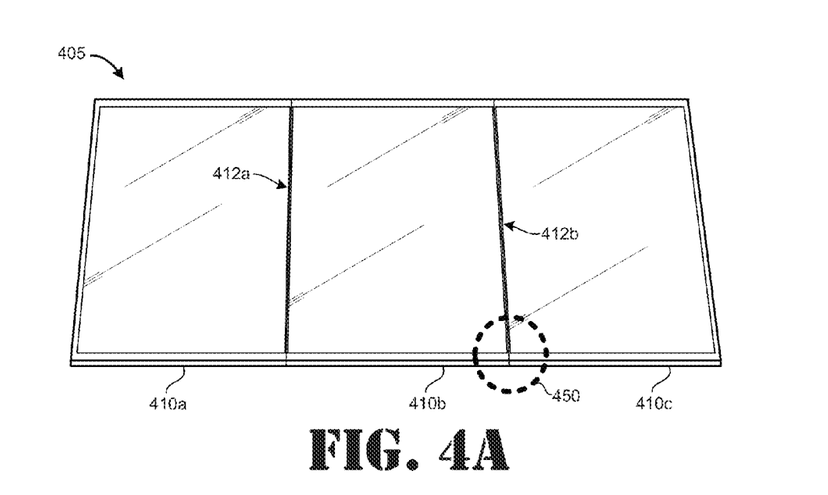
Figure 4B:
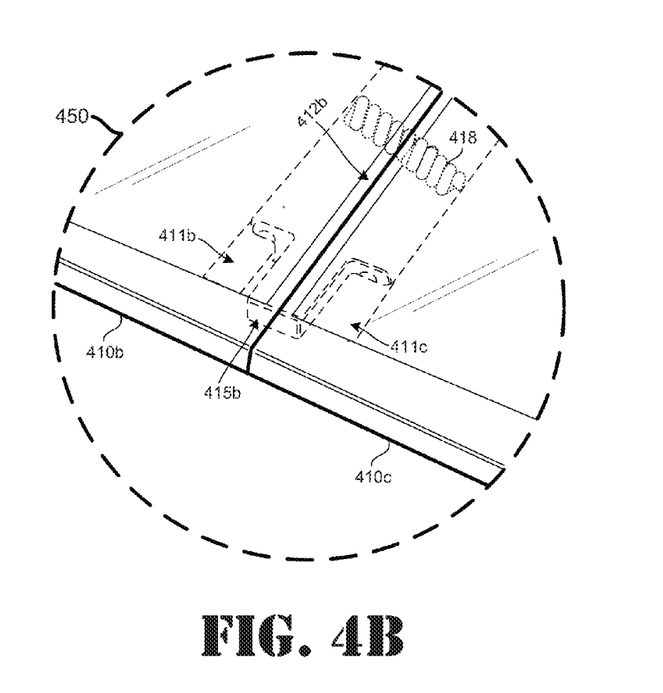
FIG. 4B is an enlarged view of the hinge area while in the locked position according to an example of the present invention.

FIG. 4A is a three-dimensional perspective view of the multi-display hinge assembly in an extended and locked positioned, while FIG. 4B is an enlarged view of the hinge area while in the locked position according to an example of the present invention. FIG. 4A illustrates the multi-display hinge assembly 405 in a locked position in which the three display housings 410a-410c are coplanar or horizontally-aligned with one another. As shown in the enlarged section view of hinge edge 412b, which connects display housing 410b with display housing 410c, when in the locked position the display housings 410b and 410c are flush and immediately adjacent to each other. More particularly, while in the locked position the display housings (e.g., 410b and 410c) are sufficiently adjacent along the hinge edge (e.g., 412b) that the hinge element (e.g., 415b) is hidden from view from the operating user as shown in FIG. 4B. According to one example, the hinge element 415b is positioned within inner edge cavity areas 411b and 411c formed along the interconnecting edge of each display housing 410b and 410c respectively, while in the locked position. The coupling member 419b includes at least one elastic coupling means 418 such as a tension or extension spring designed to contract and extract based on external/opposing forces. As shown in the present example of FIG. 4B, the coupling means (e.g., spring 418) is placed in a contracted or rested position when the display housings are coplanar with one another so as to cause the display housings to be pulled together and joined at the interconnected hinge edge 412b for example.

Figure 5A:
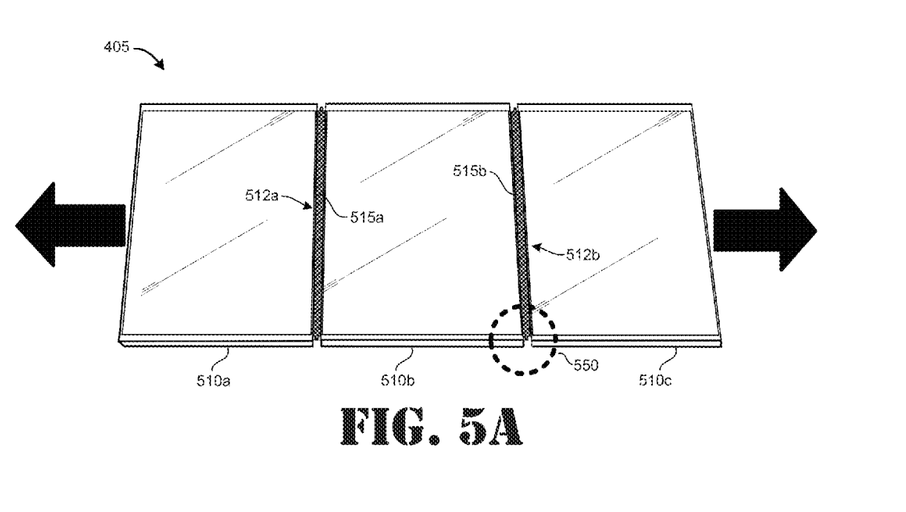
Figure 5B:
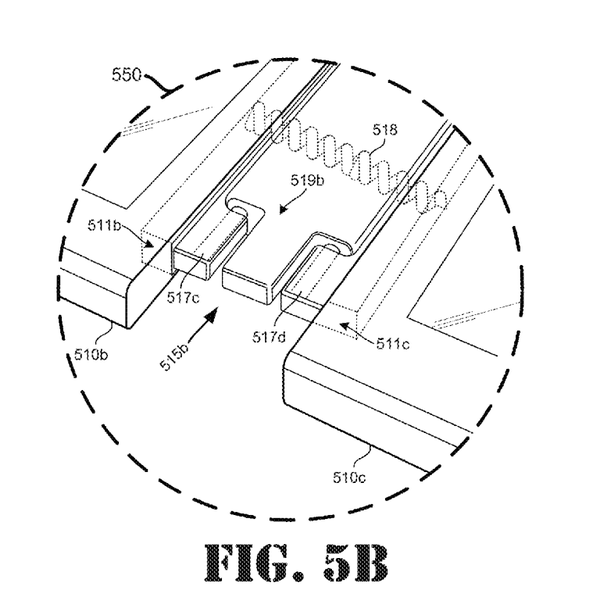
FIG. 5B is an enlarged view of the hinge area while in the unlocked position according to an example of the present invention.

FIG. 5A is a three-dimensional perspective view of the hinge area moving from a locked to an unlocked position, while FIG. 5B is an enlarged view of the hinge area while in the transition to an unlocked position according to an example of the present invention. In accordance with one example embodiment, transition from a locked to an unlocked state may be accomplished via opposing forces being exerted on the outer display housings of the multi-display hinge assembly 505. As shown in FIG. 5A, external forces (represented by directional arrows) are applied on the outer display housings 510a and 510c. Such force causes both display housing 510a and 510c to extend away from the hinge edges 512a and 512b connected with inner display housing 510b. Consequently, the tension hinge elements 515a and 515b are removed from the inner cavity of the display housings and exposed to the operating user. The enlarged view of FIG. 5B depicts the hinge element 515b, which includes the coupling member 519b and pair of rotatable bearing members 517c and 517d, in an unlocked and exposed position. As shown here, the external forces cause the coupling feature 518 to expand so as to place the display housings in an unlocked state. More particularly, when in the unlocked position, the display housings are no longer fixed in a coplanar position and may be freely rotated along the hinge edge (via the hinge element) by the user.

Figure 6:
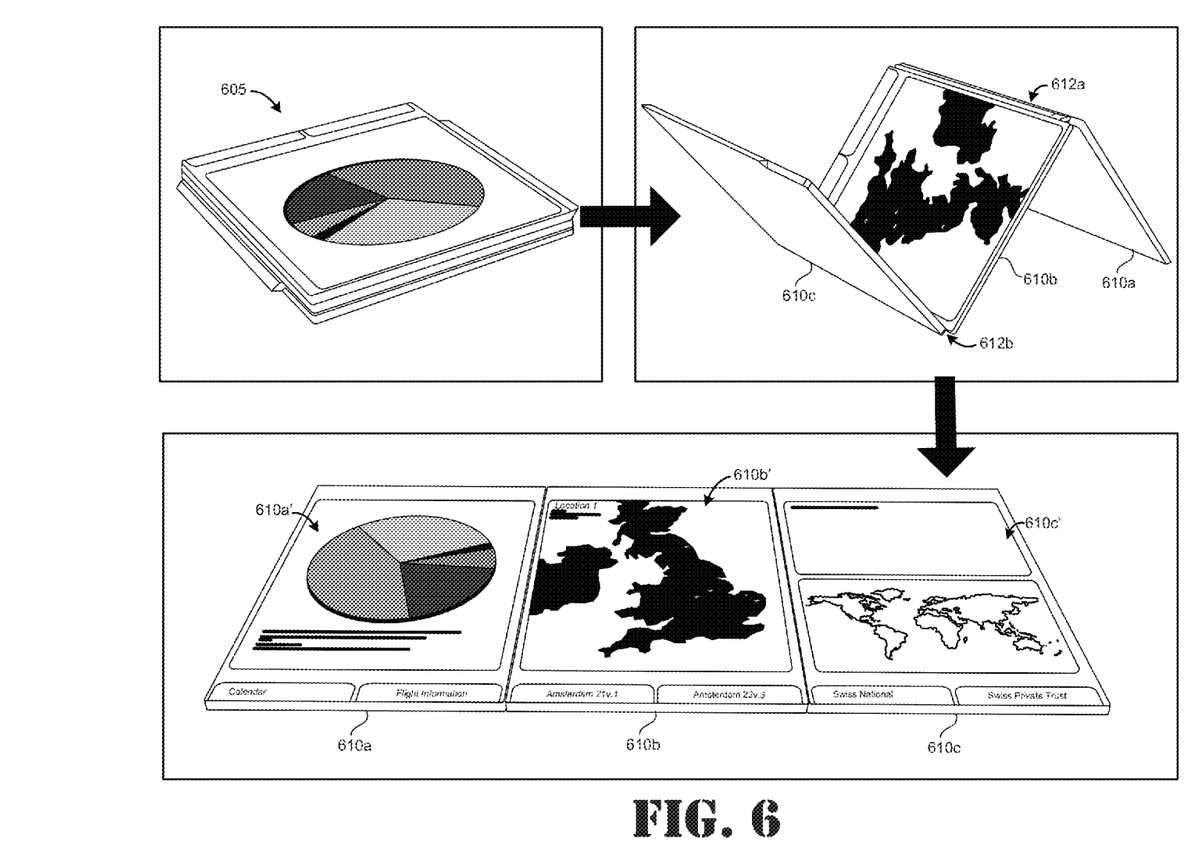
FIG. 6 are illustrations of the steps for converting the multi-display hinge assembly from a folded and unlocked position to an open and locked position in accordance with an example of the present invention.

FIG. 6 are illustrations of the steps for converting the multi-display hinge assembly from a folded and unlocked position to an open and locked position in accordance with an example of the present invention. As shown in the upper right image of FIG. 6, the multi-display hinge assembly 605 may begin in a vertically-stacked or folded position. Next, the user may elect to unfold the stacked display housings 610a-610c as shown in the upper right image of FIG. 6. During this transition, the display housings 610a-610c remain interconnected via the hinge elements as described above. More particularly, display housing 610a is rotated away from the lower surface (non-display surface) of display housing 610b about the interconnected or hinge edge 612a. Similarly, display housing 610c is rotated away from the upper or display surface of display housing 610b along hinge edge 612b. Thereafter, the three display housings 610a-610c may be positioned immediately adjacent and coplanar with each other as shown in the lower image of FIG. 6. As seen in this example, displays 610a'-610c' of each housing 610a-610c may also be configured to operate as stand-alone display for displaying disparate images rather than operating as a single large display device as depicted in FIGS. 2A and 2B.

Embodiments of the present invention provide a multi-display hinge assembly and computing system. Many advantages are afforded by the display configuration in accordance with to examples of the present invention. For instance, the hinge assembly provides a method for securely interlocking multiple thin displays while also enabling seamless and simple transition from a single display to a multi-display viewing mode. Still further, such a configuration provides a large display and work surface within a compact form factor that is well-suited for mobile computing.

Furthermore, while the invention has been described with respect to exemplary embodiments, one skilled in the art will recognize that numerous modifications are possible. For example, although exemplary embodiments depict a three interconnected display systems, the invention is not limited thereto. For example, the multi-display hinge assembly may include only two interconnected displays or four or more interconnected display systems. Similarly, the display housings may be formed of any size and shape rather than the rectangular housing depicted in the present examples. For instance, the multi-display hinge assembly may be implemented using multiple smartphone-like computing devices. Thus, although the invention has been described with respect to exemplary embodiments, it will be appreciated that the invention is intended to cover all modifications and equivalents within the scope of the following claims.

What is claimed is:

1. A multi-display hinge assembly comprising:
    a first housing;
    a second housing; and
    a hinge rotatably connecting the first housing to the second housing;
    wherein the hinge includes an interior elastic coupling element configured to join an edge of the first housing with an edge of the second housing when the first housing and the second housing are placed along the same plane,
    wherein the hinge and coupling element are continuously connected with the first housing and second housing, visibly hidden, and positioned entirely within inner cavity areas of both the first housing and the second housing when edges of the first housing and second housing are joined together in a locked position,
    wherein the first housing does not rotate relative to the second housing at the hinge when the first housing and the second housing are joined long said edges,
    wherein when external force is applied at an edge opposite the hinge and in a direction parallel to a viewing surface of at least one of the first housing and the second housing and away from the hinge, the coupling element is configured to disjoin adjacent edges of the first housing and the second housing.

2. The hinge assembly of claim 1, wherein when the first housing and the second housing are joined along said edges, the first housing does not rotate relative to the second housing at the hinge.

3. The hinge assembly of claim 2, wherein when external force is applied at an edge opposite the hinge and in a direction away from the hinge, the coupling element is configured to disjoin adjacent edges of the first housing and the second housing.

4. The hinge assembly of claim 3, wherein when the first housing and second housing are joined along the adjacent edges, viewing surfaces associated with both the first housing and the second housing are configured to operate as one large display device.

5. The hinge assembly of claim 4, further comprising:
    a third housing;
    a second hinge rotatably connecting the second housing to the third housing; and
    a coupling element that joins an edge of the third housing with an edge of the second housing when the third housing and the second housing are placed along the same plane.

6. The hinge assembly of claim 5, wherein when the edge of the third housing and the edge of the second housing are joined, the third housing does not rotate relative to the second housing at the hinge.

7. The hinge assembly of claim 5, wherein when external force is applied at unhinged edges opposite the hinge of the second housing and in a direction away from the hinge of the second housing, the coupling element is configured to disjoin the edge of the second housing from the edge of the third housing.

8. The hinge assembly of claim 5, wherein when the first housing, second housing, and third housing are joined along the edges and positioned along the same plane, the display area spans across a viewing surface of the first housing, the second housing, and the third housing.

9. The system of claim 8, wherein when in a locked state the first housing does not rotate relative to the second housing at the hinge.

10. The system of claim 8, wherein when in the locked state, a graphical display associated with either the first display housing or second display housing spans across viewing surfaces of the first display housing and the second display housing.

11. The hinge assembly of claim 1, wherein the hinge and coupling element are visibly hidden from view of a user when edges of the first housing and second housing are joined together in the locked position.

* * * * *

UNITED STATES PATENT AND TRADEMARK OFFICE
CERTIFICATE OF CORRECTION

| | | |
|---|---|---|
| PATENT NO. | : 8,971,029 B2 | Page 1 of 1 |
| APPLICATION NO. | : 13/429522 | |
| DATED | : March 3, 2015 | |
| INVENTOR(S) | : Glenn A. Wong et al. | |

It is certified that error appears in the above-identified patent and that said Letters Patent is hereby corrected as shown below:

In the Claims

In column 6, line 36, in Claim 9, delete "system" and insert -- hinge assembly --, therefor.

In column 6, line 39 approx., in Claim 10, delete "system" and insert -- hinge assembly --, therefor.

Signed and Sealed this
Fourth Day of August, 2015

Michelle K. Lee
*Director of the United States Patent and Trademark Office*